[54] ARRANGEMENT FOR REMOVAL OF FAULT CONDITIONS IN DIRECT COUPLED INFORMATION TRANSFER SYSTEMS

[72] Inventor: David Vlack, Aurora, Ill.

[73] Assignee: Bell Telephone Laboratories, Incorporated, Murray Hill, N.J.

[22] Filed: Jan. 22, 1971

[21] Appl. No.: 108,794

[52] U.S. Cl. ................................317/26, 340/163, 340/408

[51] Int. Cl. .........................................................H02l 3/00

[58] Field of Search ..................317/26; 307/99; 340/253 R, 340/408, 163

[56] References Cited

UNITED STATES PATENTS

| | | | |
|---|---|---|---|
| 3,259,802 | 7/1966 | Steen | 317/26 X |
| 3,529,292 | 9/1970 | Neill et al. | 340/163 |

*Primary Examiner*—James D. Trammell
*Attorney*—R. J. Guenther and R. B. Ardis

[57] ABSTRACT

In a direct coupled system in which information transfer units connected between a pair of signal buses communicate with one another by changing the impedance between the buses, a faulty unit which provides a continuous reduced impedance between buses significantly reduces the information transfer capacity of the system. To permit ready removal of a faulty unit, a separate circuit breaking device is connected in series with each unit in its path between buses. An attempt is made to restore all units to a high-impedance state and a fixed voltage, sufficient to operate any circuit breaking device supplying a unit not in the high-impedance state, is applied between buses. Any faulty unit is thus removed from service and the information transfer capacity of the system is restored.

6 Claims, 4 Drawing Figures

INVENTOR
D. VLACK
BY R. B. Ardis
ATTORNEY

ARRANGEMENT FOR REMOVAL OF FAULT CONDITIONS IN DIRECT COUPLED INFORMATION TRANSFER SYSTEMS

BACKGROUND OF THE INVENTION

This invention relates to information transmission systems and more particularly to systems for the removal of fault conditions on direct current coupled transmission buses.

Direct current DC bus systems generally include a signal bus comprising at least one conductor and a common ground return bus. A voltage source is connected between these buses with a separate bias resistor connected between each of the signal bus conductors and the voltage source. The information transfer units which are to communicate over this system are also connected between the buses. These information transfer units operate in a first mode providing a first impedance between the buses and at least one additional mode providing an impedance between the buses less than the first impedance. The impedances provided by the various operating modes are such that a different voltage level of the bus conductors exists for each operating mode, which voltage level is created by voltage division of the bias voltage with the bias resistor. Information is transmitted by the information transfer units by varying the impedance between the buses. The impedance of the first operating mode maintains the bus conductor at the voltage of a first logical state. The lower impedances of the additional operating modes create voltages between the buses which indicate other logical states. A control unit selects which information transfer units are to be communicating and generates signals causing the selected information transfer units to become activated to transmit or receive information. Only one information transfer unit will be enabled to transmit at any given time. Those information transfer units not receiving the activation signals are to be in a deactivated state which is characterized by the inability to communicate. All information transfer units in the deactivated state are to be in the first operating mode.

DC buses do not require the coupling devices, such as transformers and capacitors, which are required with alternating current buses so DC bus systems can be smaller and faster. However, certain disadvantages exist with DC bus systems. When, through a fault condition, a disabled information transfer unit continues to apply an impedance less than the first impedance, the entire system is affected. If all information transfer units of the DC bus, except the information transfer unit transmitting, are in the first operating mode providing the high first impedance between the buses, the transmitting unit may transmit either the first logical state by applying the first impedance or other logical states by operating in the additional modes. However, if one of the information transfer units is in a fault mode and is providing one of the additional, i.e., lesser, impedances between the buses, the information transfer unit which is to transmit cannot do so, since no voltage greater than the voltage created by the lesser impedance can exist on the line. The application of the first impedance can exist on the line. The application of the first impedance by the transmitting unit cannot raise the voltage of the line to that of the first logical state. Therefore, if an information transfer unit develops a fault which causes a continuous low impedance, the signal bus will be disabled as to the bus conductors to which the low impedance is being applied. While the signal bus is being held in a low impedance state by a faulty unit, no other communication can be carried out. Prior art systems have operated under the assumption that the bus could not be used to detect which unit is at fault. Systems produced under this assumption remedy the situation by providing some arrangement external to the signal bus for the location and removal of the faulty unit.

SUMMARY OF THE INVENTION

The present invention provides for the location and removal of faulty information transfer units by means of the signal bus. Each connection between an information transfer unit and the signal bus has a circuit breaking device serially connected therein. The circuit breaking device may, for example, be a circuit breaker or a fuse. The circuit breaking devices are chosen such that they will conduct during all possible impedance states of the information transfer units when only the DC bias voltage is applied via its bias resistors. However, if a voltage $V_H$ is applied to the signal bus, any circuit breaking device will operate to produce an open circuit if the information transfer unit corresponding to the circuit breaking device is in an impedance state less than the high first impedance state. Therefore, if the voltage $V_H$ is applied to a bus conductor to which several information transfer units are attached, one of which is providing an impedance less than the high first impedance, the circuit breaking device corresponding to the information transfer unit applying the low impedance will open-circuit and all others will remain unchanged. The voltage $V_H$ is applied to the bus at a time at which all information transfer units are to be deactivated and, therefore, when only first impedance states are to be applied to the bus.

BRIEF DESCRIPTION OF THE DRAWING

The invention will be more readily understood from the following description when read with respect to the drawing wherein.

DETAILED DESCRIPTION

Figure 1:
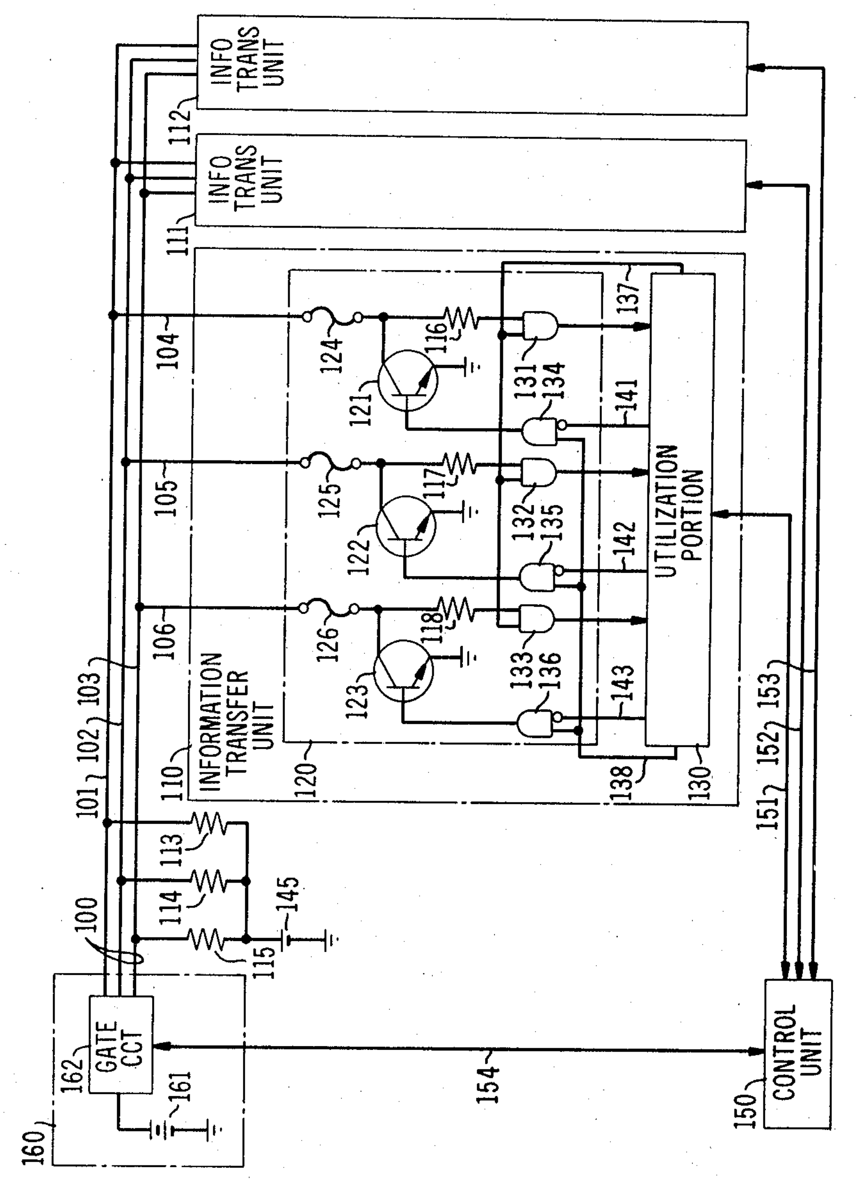
FIG. 1 is a general block diagram of a fault removal system embodying the invention.

FIG. 1 is a block diagram of a communication system, for data processing peripheral devices, using the invention. The first portion of the following description involves the communication system and its operation and the second portion involves the application of the invention to the system. The communication system of FIG. 1 includes information transfer units 110, 111, and 112 which intercommunicate with one another using the signal bus 100. The information transfer units are each comprised of an interconnection portion and a utilization portion as indicated by interconnection portion 120 and utilization portion 130 of information transfer unit 110. One utilization portion of the communication system being described may be the peripheral interface unit of a data processing system and the others may be bulk storage devices. The other information transfer units may, alternatively, be line scanners, network controllers, or other data processing peripheral units. Each of the utilization portions responds to signals from control unit 150 to become activated to transmit or receive information via signal bus 100. The communication carried out on the bus system is typically carried out for purposes of informing a data processor of information in the line scanners or bulk storage devices or for purposes of storing information from the data processor. For this reason, during most periods of communication the peripheral interface unit will be activated to communicate with one of the other utilization portions.

The signal bus 100 comprises, for example, bus conductors 101, 102, and 103 which carry information in parallel between the information transfer units. A signal bus may, of course, comprise more conductors as needed and still make use of the invention. The positive terminal of a DC voltage source 145 is connected to each of the bus conductors 101, 102, and 103 via a respective one of the resistors 113, 114, and 115. The negative terminal of the voltage source 145 is connected to a second bus shown symbolically as ground. Although the information transfer units may contain diverse types of utilization portions, as previously mentioned, the interconnection portions of all of them are substantially identical. For this reason a description of the connection of utilization portion 130 to the bus 100 via interconnection portion 120 will be a complete description of the connection of the other utilization portions to the bus. Information transfer unit 110 is connected to the bus conductors 101, 102, and 103 by means of respective ones of conductors 104, 105, and 106. The interconnection portion 120 of information transfer unit 110 includes NPN output transistors 121, 122, and 123, the collectors of which are connected to conductors 104, 105, and 106, respectively. The emitters of the output transistors are connected to the second bus which, as previously mentioned, is ground.

Due to the connection of the voltage source 145, resistors 113, 114, and 115, and output transistors 121, 122, and 123, the voltage of the bus conductors can be varied by changing the impedance between the collector and emitter of a corresponding output transistor. This impedance can be varied by varying the base to emitter voltage, which causes variations in the base current, thereby effectively changing the impedance between the collector and the emitter of the transistor. The communication system being described operates in the binary system with a logical "0" being substantially equal to a zero voltage and a logical "1" being a voltage of sufficient magnitude to cause the individual output transistors 121, 122, and 123 to lower their collector emitter impedances and cause a logical "0", i.e., a substantially zero voltage, to be placed on the corresponding bus conductor. Each of the output transistors operates in a first mode offering a high impedance path between its corresponding bus conductor and ground, causing a logical "1" to be applied to the bus, and in a second mode providing an impedance between the bus conductor and ground less than the first impedance, causing a logical "0" to be applied to the bus.

The control unit 150 coordinates communication between the information transfer units. Coded signals are selectively transmitted to the information transfer units 110, 111, and 112 via connectors 151, 152, and 153, respectively. The connectors of this embodiment are single conductors over which information can be bidirectionally transmitted. Alternatively, the connectors may be a number of conductors which provide parallel transmission of signals. The utilization portions respond to the coded signals by becoming activated to transmit and receive information. When the transmission or reception of information is completed the control unit causes the information transfer unit to become deactivated by transmitting a second coded signal.

When utilization portion 130 of information transfer unit 110 is activated by control unit 150 to receive information, a logical "1" is generated by the utilization portion on conductor 137 which enables input AND-gates 131, 132, and 133. Enabling the AND-gates 131, 132, and 133 causes a completed circuit to exist between the bus conductors and the inputs to utilization portion 130 via conductors 104, 105, and 106, isolation resistors 116, 117, and 118, and the input AND gates. The signal on conductor 137 is removed when the utilization portion has received its inputs.

When the utilization portion 130 is activated by control unit 150 to transmit information, a logical "1" is generated on conductor 138 which enables output AND-gates 134, 135, and 136, the outputs of which are connected to the base electrodes of output transistors 121, 122, and 123, respectively. Outputs of the utilization portion 130 are connected via conductors 141, 142, and 143 to inverting inputs of output AND-gates 134, 135, and 136, respectively, so that when the logical "1" occurs on conductor 138 the inverted outputs of utilization portion 130 are transmitted to the bases of the corresponding output transistors. The output transistors respond by reinverting the utilization outputs and applying the proper logical states to the bus conductors. Thus, if utilization portion 130 is to place a logical "1" on conductor 101, a logical "1" will be transmitted to the inverting input of output AND-gate 134. The utilization portion 130, in response to an activation signal from control unit 150, will transmit a logical "1" to the other input of output AND-gate 134 causing a logical "0", i.e., the inverted utilization portion output, to be transmitted to the base conductor of transistor 121. The low voltage of the logical "0" will not cause transistor 121 to provide a low impedance between its collector emitter and, therefore, the transistor will remain in the 134, mode providing a logical "1" on the bus conductor 101. If a logical "0" is to be placed on the conductor 101, a logical "1" will be the output of output AND gate 134 when the logical "1" is placed on conductor 138 by utilization portion 130. The voltage of the logical "1" applied to the base of transistor 121 will cause it to provide the low impedance of the second operating mode between the emitter and collector and thereby lower the potential of conductor 101 to that of a logical "0".

To provide communication between information transfer units, control unit 150 activates a first information transfer unit, such as information transfer unit 112, to enable its input AND gates and activates a second information transfer unit, such as information transfer unit 110, as to enable its output AND-gates 135, and 136 to transmit output signals to its output transistors 121, 122, and 123 and thereby placing information on the signal bus. In the manner described above, the information transfer unit 112 will receive from the signal bus 100 the information which was transmitted from information transfer unit 110. The control unit 150 will deactivate the information transfer units when the communication is completed. At the termination of communication between information transfer units a period of time exists during which no information transfer unit is to be transmitting or receiving. During this period of time the conductors of the signal bus 100 should be in a logical "1" state since the removal of all activation signals causes all utilization portion output AND gates to be inhibited, which should cause only logical "0's" too be applied to the bases of the output transistors. If any of the output transistors of the various information transfer units is short-circuited from collector to emitter or has a logical "1" erroneously applied to its base, it will provide a low impedance path between the corresponding signal bus conductor and ground. This condition should not exist when no communication is to be occurring between the various information transfer units.

Detection of a low impedance condition is not difficult. However, it is difficult to determine via the signal bus which information transfer unit is at fault. If one of the output transistors has failed in the low impedance state the corresponding conductor will be held continuously in the logical "0" state. This conductor cannot be used by the other information transfer units to transmit information since no matter what is done by nondefective information transfer units only the logical "0" state can exist on the conductor. In accordance with the invention, the information transfer unit defect is removed from the line via the signal bus, thereby allowing use of the signal bus for communication.

The following description shows the application of the invention to the above-described communication system. To provide the ability to remove faulty information transfer units, a separate circuit breaking device is serially connected into each of the conductors which connect the information transfer units to the bus conductors 101, 102, and 103. The circuit breaking devices of this embodiment are fuses, the characteristics of which will be described later, but they may alternatively be circuit breakers or any other current responsive circuit-opening devices. The fuses are placed in all information transfer units as fuses 124, 125, and 126 and are serially connected into conductors 104, 105, and 106 of information transfer unit 110. Also included in the illustrated embodiment of the invention is a switch 160 which is connected to each of the signal bus conductors 101, 102, and 103 and to the control unit 150. Switch 160 comprises a voltage source 161 which applies a voltage $V_H$ between ground and a gate circuit 162. The gate circuit 162 is connected to control unit 150 via connection means 154 and to the bus conductors 101, 102, and 103. The control unit 150, in addition to controlling communication between the information transfer units, produces a signal indicating the time at which no device is to be in a communication mode. This signal is a logical "1" pulse which is applied to connection means 154. Gate circuit 162 responds to this signal on connection means 154 by providing a conductive path between the source of voltage $V_H$ and the conductors 101, 102, and 103 of the signal bus 100.

The fuses which are serially connected into each conductor between the bus and the information transfer units are such that they will open-circuit in response to the current passing through them if they are in series with a low impedance path when a voltage $V_H$ is applied. Therefore, when $V_H$ is applied to the conductors 101, 102, and 103 via gate circuit 162 any of the circuit breaking devices corresponding to a transistor in the low impedance condition ($R_L$) will open-circuit. However, the voltage $V_H$ will not produce a current large enough to cause a circuit breaking device corresponding to an output transistor exhibiting a high impedance path ($R_H$) to open-circuit.

The value of $V_H$ is fixed so that $$V_H/R_H < Io$$

$$V_H/R_l \geqslant Io$$

where $Io$ = the current at which a circuit breaking device open-circuits, $R_H$ = the resistance of an output transistor to indicate a logical "1"; and $R_l$ = the resistance of an output transistor to indicate a logical "0".

Since the voltage $V_H$ is applied only when no information transfer unit is to be communicating, i.e., all information transfer units are to be in the first operating mode, and the voltage $V_H$ removes only information transfer units which are operating in a mode other than the first mode, only faulty information transfer units are removed.

In the system shown in FIG. 1, which contains switch 160, voltage $V_H$ is applied each time the control unit 150 indicates that no information transfer units are communicating. This will, indeed, keep faulty information transfer units off the signal bus but situations arise where it is desirable to be more selective in the application of the voltage $V_H$. The embodiments of the invention shown in FIGS. 2 and 3 provide more selective features.

Figure 3:
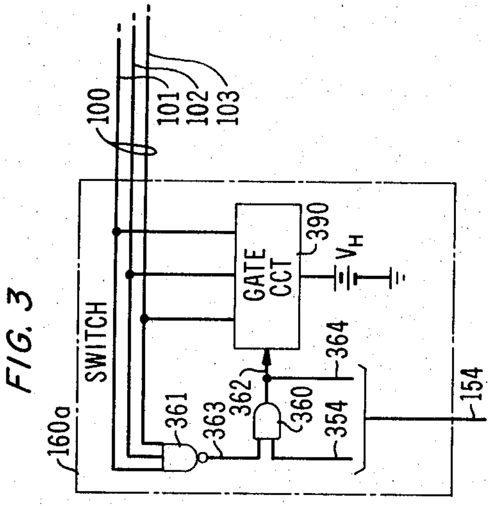
FIG. 3 illustrates a second alternative arrangement for applying $V_H$ to the bus in the embodiment of the invention shown in FIG. 1.

FIG. 3 depicts a switch 160a which is an alternative to the switch 160 of FIG. 1 and as such it is connected to the bus conductors 101, 102, and 103 as well as to the control unit 150 via connection means 154. Switch 160a includes a NAND-gate 361 which has as its inputs conductors 101, 102, and 103 of the signal bus 100. If any bus conductors are in a logical "0" state, i.e., if any bus conductor is connected to the output of an information transfer unit which is in the low impedance state, a logical "1" will be generated by NAND-gate 361 on its output conductor 363. Conductor 363 is an input to AND-gate 360. The other input to AND-gate 360 is conductor 354 which receives signals from control unit 150 via connection means 154. Each signal from control unit 150 consists of a logical "1" pulse transmitted when no information transfer unit is to be communicating, i.e., when all bus conductors should indicate a logical "1". If any signal bus conductor is in a logical "0" state when the control unit 150 indicates that no information transfer unit should be communicating, AND-gate 360 will have only logical "1" inputs, which will cause a logical "1" output to occur. This logical "1" output by AND-gate 360 indicates that a fault condition exists. The output of AND gate 360 is connected via conductor 364 of connection means 154 to the control unit 150 and via conductor 362 to the gate circuit 390. When a logical "1" is received by control unit 150 on conductor 364, the control unit will inhibit any control signal intended to cause communication between the information transfer units, for a preset period of time equal to the period of time required to apply the voltage $V_H$. In this manner no communication will be occurring when $V_H$ is being applied to a conductor. When the logical "1" indicating a fault condition appears on conductor 362, gate circuit 390 is enabled to apply the voltage $V_H$ between the bus conductors 101, 102, and 103 and common return ground. The application of the voltage $V_H$ to the bus conductors causes the circuit breaking device in series with an information transfer unit exhibiting a low impedance path to ground to open-circuit as described with reference to FIG. 1. FIG. 1, therefore, when using the switch of FIG. 3, depicts a system which determines if any low impedance fault condition exists on the bus conductors and if such a fault condition exists the voltage $V_H$ is applied to the bus conductors to remove the fault. After the removal of the faulty information transfer unit the control unit 150 can, by accessing the individual information transfer units, locate the device which is incapable of providing a low impedance between each bus conductor and ground.

Figure 2:
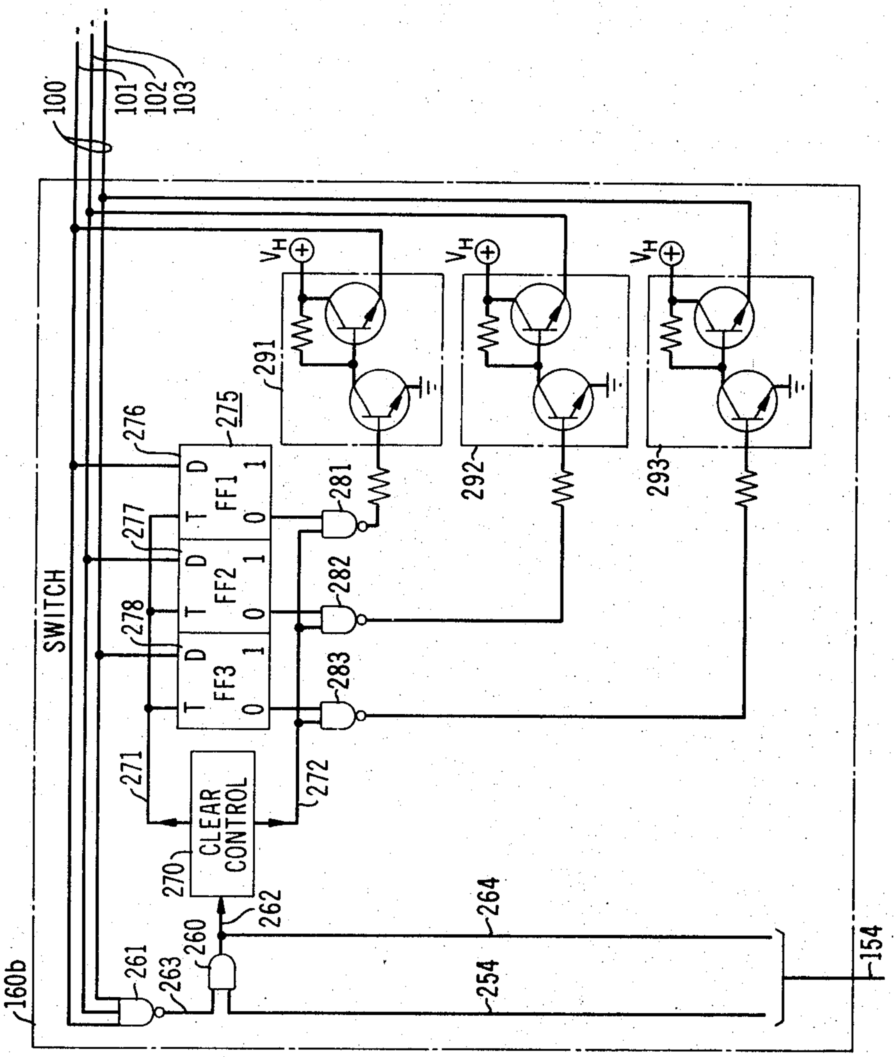
FIG. 2 illustrates a first alternative arrangement for applying $V_H$ to the bus in the embodiment of the invention shown in FIG. 1.

FIG. 2 depicts a switch 160b which is a second alternative to the switch 160 of FIG. 1. Again the switch is connected to bus conductors 101, 102, and 103 and to the connection means 154 as switch 160 is connected in FIG. 1. Switch 160b includes a NAND-gate 261 which has as its inputs conductors 101, 102, and 103 of the signal bus 100. Due to the operation of NAND-gate 261, if any bus conductor is in a logical "0" state, i.e., if any bus conductor is connected to the output of an information transfer unit which is in the low impedance state, a logical "1" will be applied to AND-gate 260 via conductor 263. The other input to AND-gate 260 is conductor 254 which receives signals from control unit 150 via connection means 154. Each of these signals consists of a logical "1" pulse transmitted when no information transfer unit is to be communicating, i.e., when all bus conductors should indicate a logical "1". Therefore, if any signal bus conductor is in a logical "0" state when the control unit 150 indicates that no information transfer unit should be communicating, AND-gate 260 will have only logical "1" inputs which will cause a logical "1" output to occur, indicating that a fault condition exists. The output of AND-gate 260 is connected via conductor 264 to the control unit 150 and via conductor 262 to the clear control unit 260. When a logical "1" is received by control unit 150 on conductor 264 of connection means 154 it will inhibit any control signal intended to cause communication between the information transfer units for a predetermined period of time equal to the period of time required to selectively apply voltage $V_H$. In this manner no communication occurs while $V_H$ is being applied. When a logical "1" appears on conductor 262 clear control unit 270 is enabled to generate a first logical "1" pulse on conductor 271 and a second logical "1" pulse on conductor 272. In this arrangement clear control unit 270 is comprised of a delay line with a first tap connected to conductor 271 and a second tap connected to conductor 272. The pulse, which is applied to clear control unit 270 by AND-gate 260, travels the delay line causing a first pulse on conductor 271 and a second pulse on conductor 272. The pulse to conductor 271 causes register 275 to assume the present state of each of the conductors of the signal bus 100. Register 275 is comprised of three gated flip-flops, called D flip-flops, 276, 277, and 278, with one flip-flop corresponding to each off the signal bus conductors 101, 102, and 103, respectively.

Figure 4:
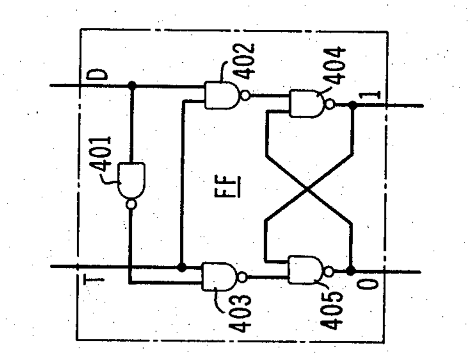
FIG. 4 is a schematic representation of a type of flip-flop which is employed in the arrangement shown in FIG. 2.

One type of D flip-flop is shown in detail in FIG. 4. The D flip-flop has a D and a T input terminal and a "0" and a "1" output terminal. A signal which is applied to the D input terminal is applied directly to NAND-gate 402 and, via inverting NAND-gate 401, to NAND-gate 403. The T-input terminal is directly connected as the only other input to both NAND-gates 402 and 403. When a logical "1" is applied to the T-input terminal the output of NAND-gate 402 will become the logic state opposite to the logic state of the D input and the output of NAND-gate 403 will become the same as the logic state of the D-input. A classical flip-flop is formed by the connection of NAND-gates 404 and 405. The output of NAND-gate 404 is connected to the "1" output terminal and to the input of NAND-gate 405. The output of NAND-gate 405 is connected to the "0" output terminal and to the input of NAND-gate 404. The individual outputs of NAND-gates 402 and 403 are connected as inputs to respective ones of NAND-gates 404 and 405. If the D-input is a logical "0" when a logical "1" is applied to the T-input terminal the output of NAND-gate 403 will be a logical "0" and the output of NAND-gate 402 will be a logical "1". The application of the logical "0" to the input of NAND-gate 405 causes its output, i.e., "0" output of the flip-flop, to become a logical "1". NAND-gate 404 having only logical "1" inputs from NAND-gates 402 and 405 generates a logical "0" output. If the D-input is a logical "1" when a logical "1" is applied to the T-input terminal the "0" output of the D-flip-flop becomes a logical "0" by the reverse of the operation described above.

The "0" output of each of the flip-flops 276, 277, and 278 is connected as an input to a respective one of NAND-gates 281, 282, and 283. Thus, if one of the conductors 101, 102, or 103 is in the logical "0" state when the pulse occurs on conductor 271 the flip-flop corresponding to the conductor having the logical "0" state will apply a logical "1" to the one of NAND-gates 281, 282, and 283 corresponding to that flip-flop. The second input to NAND-gates 281, 282, and 283 is conductor 272. When the pulse is produced on conductor 272, by clear control unit 270, those of the NAND-gates 281, 282, and 283 which correspond to a flip-flop indicating a logical "0" on the signal bus 100 will generate a logical "0" output. When the output of any of these NAND-gates 281, 282, and 283 becomes a logical "0" its corresponding driver 291, 292, or 293 will cause a voltage $V_H$ to be applied to the one conductor of the signal bus which corresponds to that NAND gate. Since the only drivers to apply $V_H$ will be those drivers corresponding to flip-flops having a logical "0" indication stored, the only conductors to receive this voltage $V_H$ will be those connected to an information transfer unit in the low impedance state. For example, assume that information transfer unit 110 is exhibiting a fault condition causing a low impedance path between conductor 103 and ground. This will cause conductor 103 to be in the logical "0" state which, in turn, causes NAND-gate 261 to apply a logical "1" to AND-gate 260. When control unit 150 of FIG. 1 produces a logical "1" pulse on conductor 254 of connection means 154, indicating that no unit is communicating, the output of AND-gate 260 will become a logical "1" in response to its two logical "1" inputs. This logical "1" will cause the control unit to momentarily stop to allow time for the completion of the application of the voltage $V_H$. It will also enable the clear control unit 270 to load register 275 with the contents of the signal bus. As result of the loading of register 275, a logical "1" will be applied to the "0" output of flip-flop 278, which corresponds to conductor 103, and logical "0's" will be applied to the "0" outputs of the remaining flip-flops 276 and 277. When the pulse is produced on conductor 272 NAND gates 281 and 282, which are receiving logical "0" inputs from their respective flip-flops 276 and 277, will retain a logical "1" output. The output of NAND-gate 283, however, which has a logical "1" to it input from flip-FLOP 278, will become a logical "0" when the pulse is produced on conductor 272. This will cause driver 293 to apply voltage $V_H$ to conductor 103. The application of this voltage will cause the circuit breaking device connecting information transfer unit 110 of FIG. 1 to conductor 103 to open-circuit but will not affect the circuit breaking devices between information transfer units 111 and 112 of FIG. 1 and conductor 103. The switch 160*b* has thereby removed the defective information transfer unit so that the signal bus may be used for later communication and for the location of which communication device was defective.

It is to be noted that the invention is not restricted to the above-described embodiments. The signal bus may consist of a single conductor which carries information serially and the inventive concepts described herein still apply. Also, the signal bus may consist of separate receive and transmit buses. In this circumstance the connections to both the receive and transmit buses may contain circuit breaking devices and either of the disclosed switch embodiments, for applying the voltage $V_H$, may be connected to either bus. Further, it is not required that the system operate in the binary system so long as the circuit breaking devices open-circuit when $V_H$ is applied and the circuit breaking device corresponds to an information transfer unit, indicating a logical state characterized by a lower impedance than the high impedance of the first operating mode. Thus, numerous modifications may be made in the illustrative embodiments and other arrangements may be devised without departing from the scope and spirit of the invention.

What is claimed is:

1. In an information transfer system which includes a pair of signal buses, each including at least one conductor, and a plurality of information transfer units connected in parallel paths between said buses each of said information transfer units having a first operating made providing a first impedance between said buses, at least one additional operating mode providing an impedance between said buses less than said first impedance, add a failure mode maintaining an impedance between said buses less than said first impedance, an information protection arrangement comprising a circuit breaking device connected in each of said parallel paths in series with a respective one of said information transfer units, each of said circuit breaking devices operating to become nonconductive when the operating current through it exceeds a predetermined threshold, control means generating control signals to which all of said information transfer units not in said failure mode respond by switching to or continuing to operate in said first operating mode, and switching means to apply a voltage between said buses of a magnitude sufficient to operate any of said circuit breaking devices in series with an information transfer unit in said failure mode but insufficient to operate the ones of said circuit breaking devices in series with information transfer units in said first operating mode, said switching means being operative to apply said voltage only upon receipt of said control signal.

2. A system in accordance with claim 1 wherein said switching means includes means responsive to said control signals to generate fault signals if any of said information transfer units are in said failure mode and means responsive to said fault signals to apply said voltage between said buses.

3. In an information transfer system which includes a signal bus comprising a first plurality of conductors, a common return ground conductor, and a plurality of information transfer units, each of said information transfer units comprising at least one gating device connected between a corresponding bus conductor and said common return ground conductor, each of said gating devices having a first operating mode providing a first impedance between said corresponding bus conductor and said common return ground, at least one additional operating mode providing an impedance between said corresponding bus conductor and said common return ground less than said first impedance, and a failure mode maintaining an impedance between said corresponding bus conductor and said common return ground less than said first impedance, an information protection arrangement comprising a circuit breaking device serially connected with each of said gating devices, each of said circuit breaking devices operating to become nonconductive when current therethrough exceeds a predetermined threshold, control means for generating control signals to which all of said gating devices not in said failure mode respond by switching to or continuing to operate in said first operating mode, and switching means to apply a voltage between said bus conductors and said common return ground of a magnitude sufficient to operate any of said circuit breaking devices in series with gating devices in said failure mode but insufficient to operate the ones of said circuit breaking devices in series with gating devices in said first operating mode, said switching means being operative to apply said voltage only upon receipt of one of said control signals.

4. A system in accordance with claim 3 wherein said switching means comprises means responsive to said control signals to generate fault signals if any of said gating devices are in said failure mode and means responsive to said fault signals to apply said voltage.

5. A system in accordance with claim 4 wherein said means responsive to said fault signals comprises means connected to said bus conductors to generate selection signals indicating which ones of said bus conductors are connected to gating devices in said failure mode and means responsive to said selection signals to apply said voltage only to those bus conductors connected to a gating device in said failure mode.

6. In an information transfer system which includes a signal bus comprising a first plurality of conductors, a common return ground conductor, and a plurality of information transfer units, each of said information transfer units comprising at least one gating device connected between a corresponding bus conductor and said common return ground conductor, each of said gating devices having a first operating mode providing a first impedance between said corresponding bus conductor and said common return ground, at least one additional operating mode providing an impedance between said corresponding bus conductor and said common return ground less than said first impedance, and a failure mode maintaining an impedance between said corresponding bus conductor and said common return ground less than said first impedance, an information protection arrangement comprising a circuit breaking device serially connected with each of said gating devices, each of said circuit breaking devices operating to become nonconductive when the current therethrough exceeds a predetermined threshold, control means for generating control signals to selectively activate and deactivate said information transfer units, the gating devices of said deactivated information transfer units not in said failure mode respond by switching to or continuing to operate in said first operating mode, said control means further generating a first signal indicating all information transfer units as being deactivated, means for generating a second signal if any of said gating devices are not in said first operating mode, means responsive to the concurrence of said first and said second signal to generate a first and second pulse, means responsive to said first pulse to store the present state of each of said bus conductors and generate a fault signal corresponding to the ones of said bus conductors having a gating device not in said first operating mode connected thereto, and means responsive to the concurrence of said second pulse and said fault signals to apply a voltage to those bus conductors having a gating device not in said first operating mode, said voltage being of sufficient magnitude to operate any of said circuit breaking devices in series with a gating device in said failure mode but insufficient to operate the ones of said circuit breaking devices in series with gating devices in said first operating mode.

* * * * *

UNITED STATES PATENT OFFICE
CERTIFICATE OF CORRECTION

Patent No. 3,649,873 Dated March 14, 1972

Inventor(s) David Vlack

It is certified that error appears in the above-identified patent and that said Letters Patent are hereby corrected as shown below:

In the column 1, at the lines 56 and 57, delete the sentence "The application of the first impedance can exist on the line." In the column 4, at line 7, the term "134," should read --first--; at the line 20, delete the second occurrence of the word "as"; and at the line 21, after "gates" insert --134,--. In the column 7, at line 54, delete "to it" and insert --applied to its--. At the line 8 of claim 1, the word "add" should read --and--.

Signed and sealed this 19th day of September 1972.

(SEAL)
Attest:

EDWARD M.FLETCHER,JR.
Attesting Officer

ROBERT GOTTSCHALK
Commissioner of Patents